US009527580B2

(12) United States Patent
Lang et al.

(10) Patent No.: US 9,527,580 B2
(45) Date of Patent: Dec. 27, 2016

(54) CONE BRAKE NO-BACK ASSEMBLY WITH GAIN REDUCTION SPRING AND METHOD

(71) Applicant: Hamilton Sundstrand Corporation, Windsor Locks, CT (US)

(72) Inventors: David J. Lang, Rockford, IL (US); Mark D. Miller, Rockford, IL (US); James M. Regan, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 98 days.

(21) Appl. No.: 14/495,147

(22) Filed: Sep. 24, 2014

(65) Prior Publication Data

US 2016/0083080 A1    Mar. 24, 2016

(51) Int. Cl.
| F16D 65/02 | (2006.01) |
| B64C 13/28 | (2006.01) |
| F16D 59/02 | (2006.01) |
| B64C 13/42 | (2006.01) |
| F16D 125/36 | (2012.01) |

(52) U.S. Cl.
CPC ............... *B64C 13/28* (2013.01); *B64C 13/42* (2013.01); *F16D 59/02* (2013.01); *F16D 65/028* (2013.01); *F16D 2065/024* (2013.01); *F16D 2125/36* (2013.01)

(58) Field of Classification Search
CPC .......... F16D 55/28; F16D 55/36; F16D 55/38; F16D 67/02; F16D 59/00; F16D 2121/22; F16D 2125/38; F16D 2055/0058; F16H 35/10; F16B 1/04

USPC .... 188/82.9, 134, 218 XL, 181 T; 192/41 R, 192/223.3, 52.1, 52.2, 52.4, 54.1, 54.5, 192/223.1; 74/89.26

See application file for complete search history.

(56) References Cited

U.S. PATENT DOCUMENTS

| 1,774,144 | A | | 8/1930 | Jones |
| 2,063,445 | A | | 12/1936 | Lambert |
| 2,089,996 | A | | 8/1937 | Fast |
| 2,136,971 | A | * | 11/1938 | Fleischel ............ F16H 61/0262 |
| | | | | 192/48.609 |
| 2,675,898 | A | | 4/1954 | Porter |
| 3,722,641 | A | | 3/1973 | Kusiak |
| 4,176,733 | A | | 12/1979 | Twickler |

(Continued)

FOREIGN PATENT DOCUMENTS

| EP | 1378685 A | 4/2006 | |
| GB | EP 0727594 A2 * | 8/1996 | ........... F16D 43/208 |
| JP | 200097308 A | 11/2006 | |

*Primary Examiner* — Thomas J Williams
*Assistant Examiner* — San Aung
(74) *Attorney, Agent, or Firm* — Cantor Colburn LLP (57) ABSTRACT

A no-back assembly includes a first disc coupled to a first shaft and arranged radially outward of the first shaft. Also included is a first brake arranged radially outward of the first disc. Further included is a spring adjacent the first brake. Yet further included is a second disc coupled to a second shaft and arranged radially outward of the second shaft. Also included is a second brake arranged radially outward of the second disc. Further included is at least one pin operatively coupling the first brake and the second brake to a housing of the no-back assembly, a gain reduction spring disposed within a recess of the housing, and a piston disposed in contact with the gain reduction spring and a first side of the pin, wherein the gain reduction spring biases the piston against the first side of pin, wherein the pin is biased against the housing.

14 Claims, 5 Drawing Sheets

(56) References Cited

U.S. PATENT DOCUMENTS

| | | |
|---|---|---|
| 4,352,415 A | 10/1982 | Powell |
| 4,483,429 A | 11/1984 | Tiedeman |
| 4,582,187 A | 4/1986 | Sekella |
| 4,597,477 A * | 7/1986 | Miller .................. F16D 43/02 188/134 |
| 4,693,349 A | 9/1987 | Tysver |
| 4,697,672 A | 10/1987 | Linton |
| 4,850,458 A | 7/1989 | Allan et al. |
| 4,909,363 A | 3/1990 | Trommer |
| 5,090,529 A | 2/1992 | Fahy et al. |
| 5,199,538 A | 4/1993 | Fischer et al. |
| 5,299,676 A | 4/1994 | Wade |
| 5,353,901 A | 10/1994 | Jacques et al. |
| 5,630,490 A | 5/1997 | Hudson et al. |
| 5,655,636 A | 8/1997 | Lang et al. |
| 5,943,911 A | 8/1999 | Beckerman |
| 5,944,148 A | 8/1999 | Bae et al. |
| 6,202,803 B1 | 3/2001 | Lang |
| 6,631,797 B2 | 10/2003 | Capewell |
| 6,814,209 B1 | 11/2004 | Acosta |
| 6,974,015 B2 * | 12/2005 | Gamache .............. F16D 67/02 188/134 |
| 7,143,888 B2 | 12/2006 | Lang |
| 8,215,471 B2 | 7/2012 | Wasser |
| 8,220,598 B2 | 7/2012 | Valembois |
| 2002/0121421 A1 | 9/2002 | Capewell |
| 2003/0051950 A1 | 3/2003 | Harvey |
| 2003/0205442 A9 | 11/2003 | Capewell |
| 2004/0035653 A1 | 2/2004 | Christensen |
| 2004/0040813 A1 | 3/2004 | Darby et al. |
| 2006/0163026 A1 * | 7/2006 | Lang ..................... B64C 13/28 192/223 |
| 2008/0185242 A1 | 8/2008 | Mayer et al. |
| 2011/0048147 A1 | 3/2011 | Keech et al. |
| 2011/0240421 A1 * | 10/2011 | Lang ..................... B64C 13/28 188/218 XL |

* cited by examiner

CONE BRAKE NO-BACK ASSEMBLY WITH GAIN REDUCTION SPRING AND METHOD

BACKGROUND OF THE INVENTION

The embodiments described herein generally relate to a no-back for use with an actuation system.

No-backs are typically used with aircraft actuators, which may be used to displace an aircraft surface, such as a flap, a leading edge, or a trailing edge of a wing. Multiple actuators may be positioned on opposing sides of an aircraft, and are typically driven by an input, which may be a drive line torque shaft. In the event of failure or disconnect of the drive line torque shaft, for example, a no-back will prevent an associated aircraft surface from being displaced from a desired position.

BRIEF DESCRIPTION OF THE INVENTION

According to one embodiment, a no-back assembly includes a first disc coupled to a first shaft and arranged radially outward of the first shaft. Also included is a first brake arranged radially outward of the first disc, the first brake being configured to prevent the first disc from rotating when in a no-back condition. Further included is a spring adjacent the first brake, the spring configured to urge the first brake toward the first disc to prevent the first disc from rotating when in the no-back condition. Yet further included is a second disc coupled to a second shaft and arranged radially outward of the second shaft. Also included is a second brake arranged radially outward of the second disc, the second brake being configured to prevent the second disc from rotating when in the no-back condition. Further included is at least one pin operatively coupling the first brake and the second brake to a housing of the no-back assembly. Yet further included is a gain reduction spring disposed within a recess of the housing. Also included is a piston disposed in contact with the gain reduction spring and a first side of the pin, wherein the gain reduction spring biases the piston against the first side of pin, wherein a second side of the pin is biased against a retaining ring of the housing.

According to another embodiment, a method is provided. The method includes rotating a disc in a first rotational direction when in a first operational state. The method also includes moving the disc in a first axial direction when in a second operational state, when in the second operational state, urging a brake in a second axial direction opposite the first axial direction such that the brake is wedged into the disc and thus prevents the disc from rotating. The method further includes biasing a piston against the brake with a gain reduction spring to urge the brake against a retaining ring and a housing.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3b is a section taken along line $A_1$-$A_1$ from FIG. 3a;

FIG. 3e is a section taken along line $A_2$-$A_2$ from FIG. 3a;

DETAILED DESCRIPTION OF THE INVENTION

Figure 1:
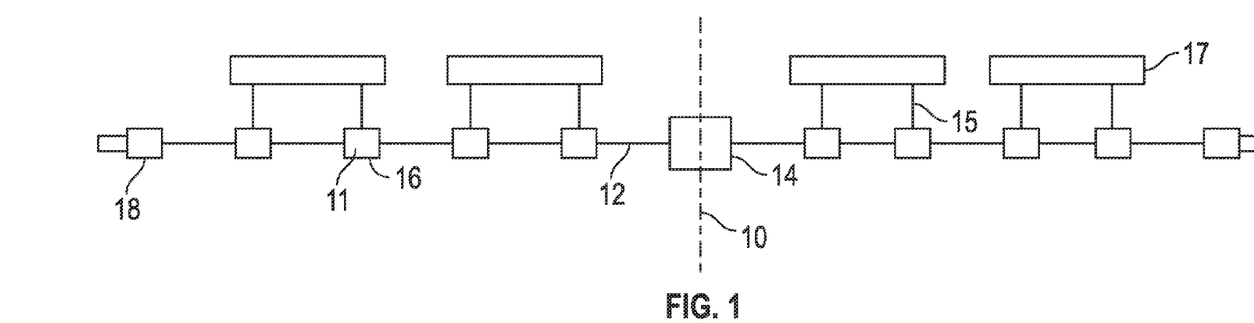
FIG. 1 is a schematic representative of an aircraft's actuation system.

Referring to FIG. 1, a schematic representative of an aircraft's actuation system is shown. Multiple actuators 11 may be arranged about a centerline 10 of the aircraft. Each of the actuators 11 are driven by an input (shown generically as actuator input 20 in FIG. 2) from the drive line torque shaft 12, and may be coupled to a load 17 by way of a linkage mechanism 15. The drive line torque shaft 12 is driven by a PDU, or power drive unit, 14. The load 17 may be a movable aircraft surface, such as a flap, leading edge, or trailing edge of a wing. The load 17 generally imparts a torque, or load, on respective actuators 11. This load imparted onto the actuators 11 generally opposes the torque generated by the input from the drive line torque shaft 12. In a system without no-backs 16, an input insufficient to oppose the load 17 (e.g., if the drive line torque shaft or the PDU were to fail) may cause the actuator 11 to back-drive, thus causing the load 17 to displace from a desired position. Thus, each of the actuators 11 include no-backs 16 to prevent back-drive of the actuators 11 and to prevent unwanted displacement of the load 17. In this regard, the no-backs 16 help maintain overall aircraft control. The system may further include position sensors 18 at either end of the drive line torque shaft 12 to monitor system position.

Figure 2:
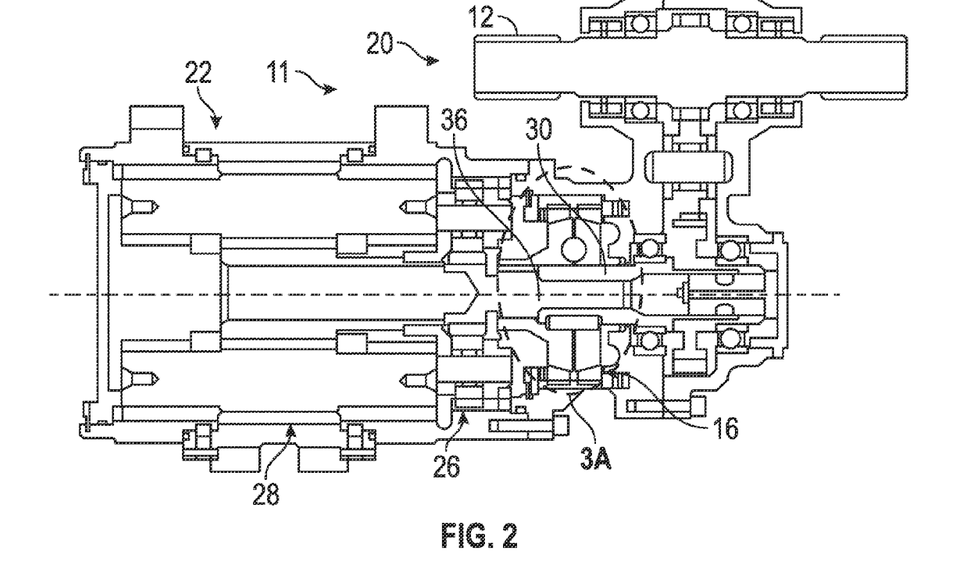
FIG. 2 is a typical rotary actuator including a cone brake no-back.

Referring to FIG. 2, an actuator 11 including a no-back 16 is shown. As explained, the no-back 16 may be driven by an actuator input 20, which may be the drive line torque shaft 12. The drive line torque shaft 12 may rotate in forward and reverse directions. The drive line torque shaft 12 drives the no-back input shaft 30 which, in turn, drives the no-back output shaft 36. The no-back output shaft 36 is operatively coupled to the actuator output 22. The actuator output 22 may include input and output planetary gears 26 and 28, respectively, in communication with the no-back output shaft 36. The actuator output 22 is coupled to the load 17 by way of a linkage mechanism 15 (represented in FIG. 1). The elements included within the no-back 16 are generally within area A. Area A is shown in detail in FIG. 3a.

Figure 3A:
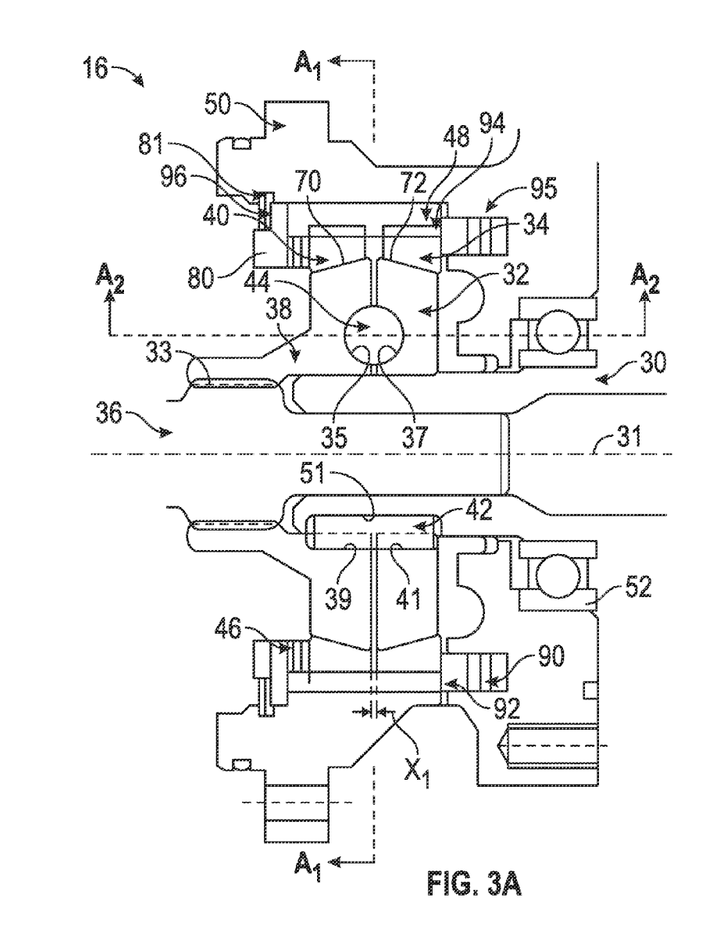
FIG. 3a is a view of area A from FIG. 2 depicting the cone brake no-back in a no-load, or opposing load, condition.
Figure 4:
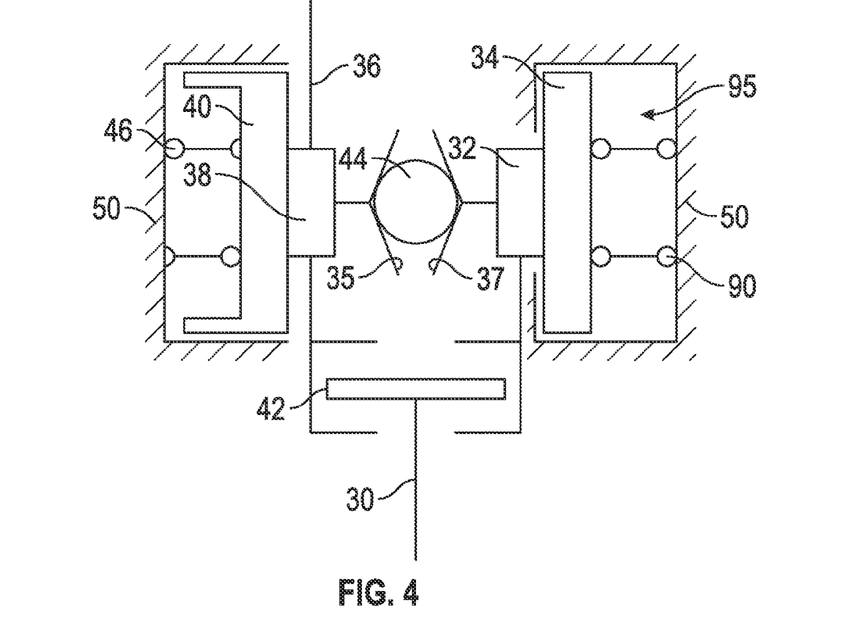
FIG. 4 is a schematic representative of the no-back in a no-load condition.
Figure 5:
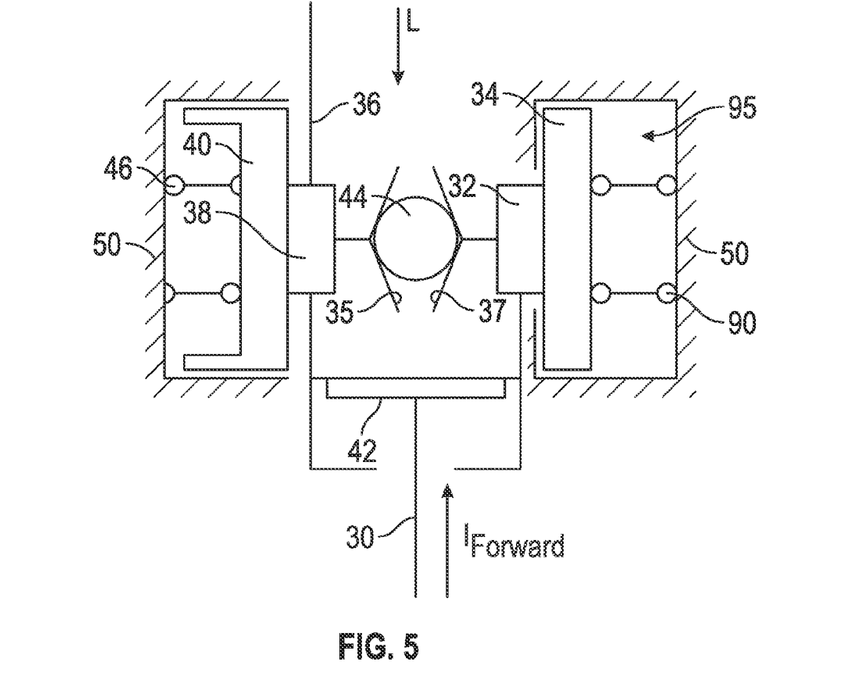
FIG. 5 is a schematic representative of the no-back in an opposing load condition.

FIG. 3a, is representative of the arrangement of the no-back 16 in a no-load condition, and in an opposing-load condition (schematically represented in FIGS. 4 and 5, respectively). In the opposing load condition, for example, the no-back 16 is positioned such that it allows the no-back input shaft 30 to transfer rotation to the no-back output shaft 36. The no-back input shaft 30, which may be supported by bearing 52, is coupled to the no-back output shaft 36 by way of input and output discs 32, 38 arranged about the outer periphery of input and output shafts 30, 36. The input and output discs 32, 38 may be made of a hardened steel, for example, and may be coated. Notably, as shown, the no-back output shaft 36 is only coupled to the output disc 38, whereas the no-back input shaft 30 is operatively coupled to both of the input and output discs 32, 38.

The input and output discs 32, 38 are rotatably coupled to the no-back input shaft 30 by way of pins 42 arranged about the outer diameter of the no-back input shaft 30, for example. The no-back input shaft 30 may include recesses 51 about its outer diameter, each of which may receive a portion of a pin 42. The input and output discs 32, 38 may also include recesses 41 and 39, respectively. Each of the recesses 39, 41 are aligned with the recesses 51 to receive a portion of the pins 42. Alternatives to pins 42 such as spline teeth, keys, etc. may be used. Further, the output disc 38 may be coupled to the no-back output shaft 36 by way of a geared, or splined, connection 33.

Cone brakes 34, 40 are arranged about the outer periphery of (or, radially outward of) the input and output discs 32, 38, respectively. The cone brakes 34, 40 may be made of a known steel, for example. In the example shown, the cone brakes 34, 40 are coupled to a housing 50 by way of pins 48. The cone brakes 34, 40 may be coupled to the housing 50 such that they are rotatably fixed with respect to the input and output discs 32, 38, but can axially slide in the direction of the pins 48. The pins 48 may extend generally parallel to the axis 31, and thus the cone brakes 34, 40 may axially slide in the direction of the axis 31. A spring 46 may be disposed on one axial side of the cone brake 40 (in FIG. 3a, the spring 46 is disposed to the left of the cone brake 40) and may bias (or preload, or urge) the cone brake 40 to the other axial side (in FIG. 3a, the spring 46 biases the cone brake 40 to the right). The spring 46 may be a single compression spring, or a set of compression springs, and may be selected of an appropriate material, which may be a hardened steel, for example.

In the no-load and opposing load conditions, the spring 46 may contact the cone brake 40, which in turn contacts output disc 38, but it does not do so with sufficient force to prevent the input and output discs 32, 38 from rotating relative to respective cone brakes 34, 40. The spring 46 is utilized to urge (or, preload) the cone brake 40 and the output disc 38 into alignment with input disc 32 and cone brake 34, such that the balls 44 are positioned in the deep center portions 62 of the ballramps 35 and 37 (explained in detail below). The inner periphery of the cone brakes 34, 40 may include sloped, or angled, surfaces (generally represented at 70, 72). The outer periphery of the input and output discs 32, 38 also include sloped, or angled, surfaces (generally represented at 70, 72) such that the sloped surfaces of the cone brakes 34, 40 correspond with the sloped surfaces of a respective input disc 32, 38. Respective sloped surfaces of output disc 38 and cone brake 40 are generally represented by reference numeral 70. The sloped surfaces of input disc 32 and cone brake 34 are generally represented by reference numeral 72. As seen in FIG. 3a, respective sloped surfaces 70, 72 of the input and output discs 32, 38 and the cone brakes 34, 40 are sloped such that they extend generally parallel to one another. One will further appreciate that the sloped surfaces 70, 72 are sloped, or angled, relative to the axis 31.

The input and output discs 32, 38 are spaced apart by a distance $X_1$ when in the no-load, or opposing load, condition shown in FIG. 3a. The spacing of the input and output discs 32, 38 with respect to one another is regulated, in part, by the position of the balls 44 between the input and output discs 32, 38. Each of the input and output discs 32, 38 includes a ballramp 37, 35, respectively. The ballramps 35, 37 may extend into the input and output discs 32, 38 at a varying depth. The relationship of the position of the balls 44 within the ballramps 35, 37 to the spacing of the input and output discs 32, 38 is explained in detail below.

Figure 3B:
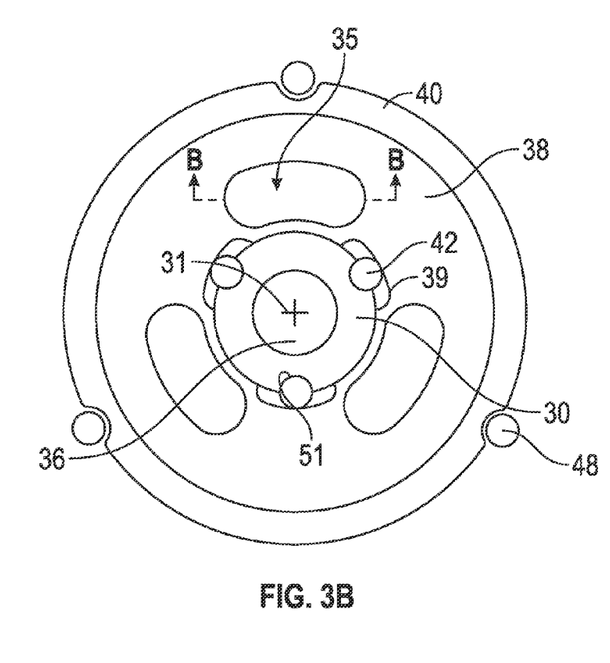

Referring to FIG. 3b, a view taken along line $A_1$-$A_1$, from FIG. 3a, is shown. As explained, the recesses 39 formed in the output disc 38 may be arranged to correspond with the recesses 51 formed in the no-back input shaft 30. As shown, each of the recesses 39 and 51 receives a portion of a pin 42. In this manner, the no-back input shaft 30 is rotatably (or, operatively) coupled to the output disc 38 such that rotation of the no-back input shaft 30 is transferred to the output disc 38. Pins 48 may be arranged about the outer periphery of the cone brake 40. The pins 48 may be grounded to the housing 50, thereby preventing the cone brake 40 from rotating, but allowing it to slide axially. Kidney-shaped ballramps 35 are formed within the output disc 38, and are sized to receive at least a portion of a ball 44 therein. The ballramps 35 are explained in detail below.

Figure 3C:
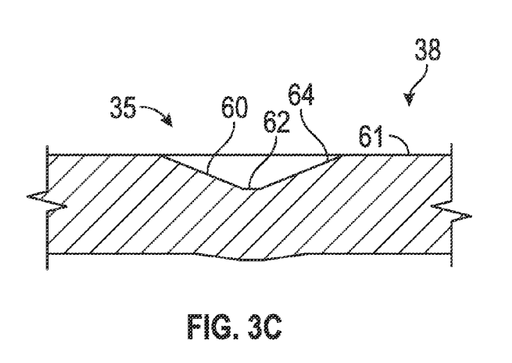
FIG. 3c is a section taken along line B-B from FIG. 3b.

FIG. 3c is a view taken along line B-B, from FIG. 3b, and is representative of the varying depth of the ballramps 35, 37 as they extend into the input and output discs 32, 38. As shown, the ballramp 35 may include a deep center portion 62, which is the deepest portion of the ballramp 35. Shallow ends 60, 64 of the ballramp 35 may be sloped, or may taper, downwardly from an outer surface 61 of the output disc 38 toward the deep center portion 62. When the no-back 16 is in the no-load and opposing-load conditions (as shown in FIG. 3a and as schematically represented in FIGS. 4 and 5), the balls 44 may generally be positioned in the deep center portion 62 of respective ballramps 35, 37. This position may be referred to as a neutral position, shown in FIG. 3e. In this way, the balls 44 are positioned such that they extend into the input and output discs 32, 38 relatively deeply, and thus the distance $X_1$ between the input and output discs 32, 38 is relatively small. That is, the input and output discs 32, 38 may be positioned such that the deep center portions 62 of the ballramps 35, 37 are in alignment, and such that the balls 44 are positioned between respective deep center portions 62 of the ballramps 35, 37. In the no-load and opposing-load conditions, the spring 46 generally urges the brake 40 such that the input and output discs 32, 38 are aligned, thus causing the balls 44 to settle in the deep center portions 62.

Figure 3D:
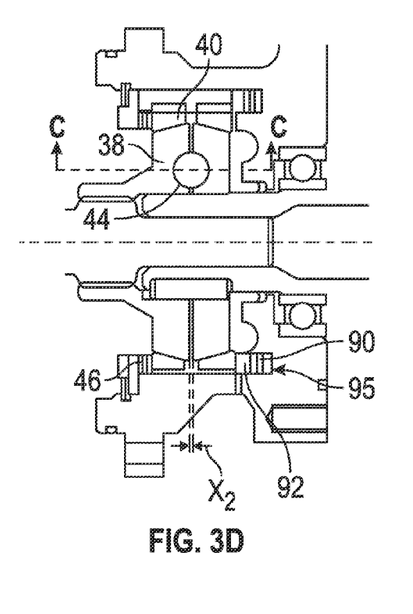
FIG. 3d is a view of area A from FIG. 2 depicting the cone brake no-back in a no-back condition.
Figure 6:
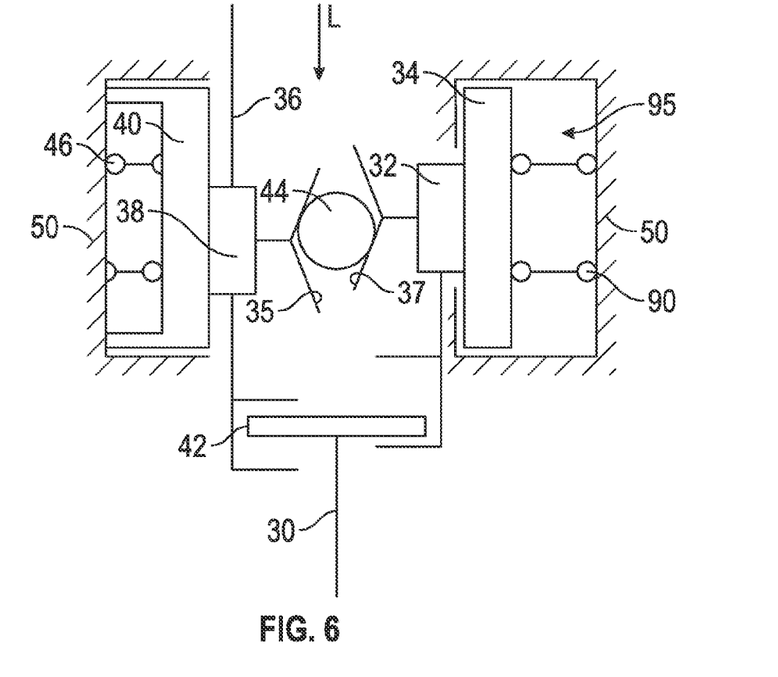
FIG. 6 is a schematic representative of the no-back in a no-back condition.

Referring to FIG. 3d, the no-back 16 is shown in a no-back (or, holding-load) condition (schematically represented in FIG. 6). Such a no-back condition may be created when the actuator input 20 is insufficient to oppose the load 17, or when the actuator input 20 fails (due to a failure of the PDU 14 or the drive line torque shaft 12, for example). In absence of actuator input 20, or when the actuator input 20 is insufficient to oppose the load 17, the load 17 may cause reverse rotation of the no-back output shaft 36, which in turn may cause output disc 38 to rotate relative to input disc 32 (because the no-back output shaft 36 is only coupled to the output disc 38, and not both of the input and output discs 32, 38). In this regard, the deep center portions 62 of the ballramps 35, 37 will also rotate out of alignment, and the balls 44 will be moved toward the shallow ends 60, 64 of the ballramps 35, 37, as shown in FIG. 3f. Because the shallow ends 60, 64 do not extend as deeply into the respective input and output discs 32, 38 as the deep center portion 62, the positioning of the balls 44 causes the output disc 38 to become axially spaced from input disc 32 by a distance $X_2$ (this position may be referred to as an extended position, shown in FIG. 3f), which is greater than the distance $X_1$. This positioning of the balls 44 generates an axial load on the input and output discs 32, 38 greater than the preload (or biasing force) generated by the spring 46.

As the balls 44 are positioned toward the shallow ends 60, 64 of the ballramps 35, 37, the output disc 38 engages the cone brake 40 (by way of their respective sloped surfaces 70) and causes the cone brake 40 to axially slide with the output disc 38 (to the left in FIG. 3d). Again, as the load 17 is applied to the no-back output shaft 36, and then to the output disc 38, an axial load is generated by the balls 44 that is transferred to both discs 32 and 38. This axial load generated by the balls 44 passes from the input and output discs 32, 38 to the cone brakes 34, 40, thus displacing output disc 38 and cone brake 40 (to the left in FIG. 3d) relative to their position in the no-load and opposing-load conditions shown in FIG. 3a. The cone brake 40 thus compresses the spring 46 against the spacer 80 and retaining ring 81, both of which are fixed to the housing 50. By way of the compression of the spring 46, the cone brake 40 is urged toward the output disc 38 against the axial load generated by the positioning of the balls 44. In this manner, the cone brake 40 is wedged into the output disc 38 by way of the respective sloped surfaces 70. This wedging action thus creates a frictional force between the cone brake 40 and the output disc 38 and between cone brake 34 and the input disc 32, respectively, creating a combined resistance torque ($T_r$) sufficient to overcome the torque created by load 17 on the no-back output shaft 36 ($T_{load}$). In this manner, the no-back input and output shafts 30, 36 and the input and output discs 32, 38 are prevented from rotating. Thus, the load 17 is prevented from being displaced, and the no-back condition is effectively provided.

The following relationship may be referred to as gain (G):

$$G = T_r/T_{load}$$

One of ordinary skill will appreciate that several factors may affect gain (G) including: the material(s) chosen for the input and output discs 32, 38 and the cone brakes 34, 40; the slope of the sloped surfaces 70, 72; the dimensions of the ballramps 35, 37, etc. In order for the no-back 16 to work properly, the gain (G) must be greater than 1 when in the no-back condition. That is, the above-mentioned factors must be set such that $T_r > T_{load}$ when in the no-back condition.

Figure 3E:
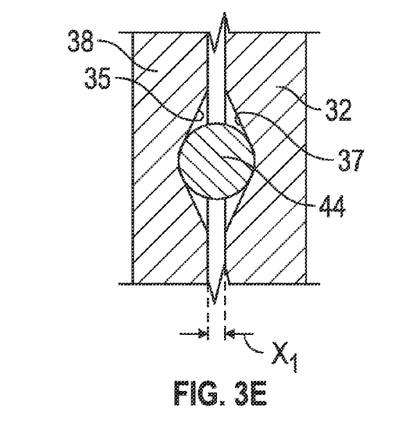
Figure 3F:
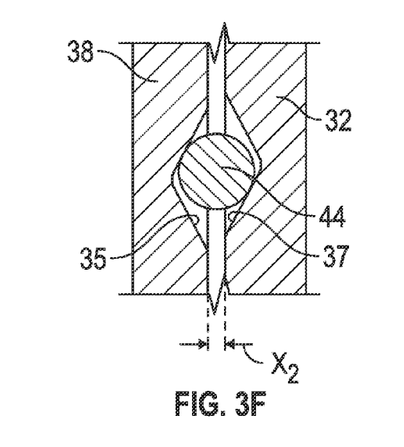
FIG. 3f is a section taken along line C-C from FIG. 3d.

FIG. 3e is a view taken along line $A_2$-$A_2$ from FIG. 3a and shows the balls 44 arranged between the ballramps 35, 37 of the input and output discs 32, 38 such that the discs are spaced apart by a distance $X_1$. FIG. 3e is representative of a neutral position. The neutral position may be present during a no-load condition (schematically represented in FIG. 4) and an opposing load condition (schematically represented in FIG. 5). The neutral position exists when the deep center portions 62 of the respective input and output discs 32, 38 are in alignment, and the balls 44 are positioned between respective deep center portions 62.

FIG. 3f is a view taken along line C-C from FIG. 3d and shows the balls 44 arranged between the ballramps 35, 37 of the input and output discs 32, 38 such that input and output discs 32, 38 are spaced apart by a distance $X_2$. FIG. 3f is representative of an extended position. The extended position may be present during the no-back condition or during an aiding-load condition (schematically represented in FIGS. 6 and 7, respectively). The extended position exists when the deep center portions 62 of the respective input and output discs 32, 38 are out of alignment, and the balls 44 are positioned between respective shallow ends 60, 64 of the ballramps 35, 37. This positioning of the balls 44 creates an axial load on the input and output discs 32, 38 sufficient to overcome the preload (or biasing force) of the spring 46.

Referring again to FIG. 3a, a gain reduction spring 90 is disposed in a recess 95 and extends between the housing 50 and a piston 92. The gain reduction spring 90 preloads the piston 92 against the pins 48, which press against the spacer 80, the retaining ring 81, and the housing 50. In particular, the piston is in contact with a first side 94 of the pin 48, which then biases a second side 96 of the pin 48 against the retaining ring 81 of the housing 50. The gain reduction spring 90 is employed to minimize dynamic loading on the overall mechanism. This is achieved by providing compliance to the mechanism during dynamic operation by increasing the natural frequency of the unit components which are subjected to driving frequencies associated with the unit's shaft speeds. Such a system advantageously reduces vibration and noise associated with operation of the mechanism, thereby lengthening the lifespan of the component.

Referring to FIG. 4, the no-back 16 is schematically represented in a no-load condition. The no-load condition is also represented in FIG. 3a. Notably, in the no-load condition, the load 17 may be present, but may be positioned in a rest position so as to not impart a torque, or load (such as $T_{load}$), on the no-back output shaft 36. Thus, there may be no input (e.g., from actuator input 20), as there is no load for the input to oppose. As can be seen in FIG. 4, the ball 44 is positioned in the center (shown as the deep center portion 62 in FIG. 3c) of respective ballramps 35, 37. That is, the input and output discs 32, 38 are aligned such that the center of the ballramps 35, 37 are in alignment. Cone brakes 34, 40 are positioned outside of, or about the outer periphery of, the input and output discs 32, 38. As shown, spring 46 is positioned between the cone brake 40 and the housing 50 (the spring 46 may actually be in operative connection with the housing 50 by way of the spacer 80 and retaining ring 81, as shown in FIG. 3a, for example).

Referring to FIG. 5, the no-back 16 is schematically represented in an opposing-load condition (which is also represented in FIG. 3a). In this condition, a forward input, $I_{forward}$, is sufficient to oppose, or overcome a load, L. That is, the forward input, $I_{forward}$, drives the no-back output shaft 36 in a forward rotational direction, such that the load L, which generally urges the no-back output shaft 36 in a reverse rotational direction, is opposed. In this manner, the load 17 is generally maintained in a desired position by virtue of the forward input, $I_{forward}$. Note that the forward input, $I_{forward}$, is shown as engaging the input and output discs 32, 38 by way of a pin 42 (as described above).

Referring to FIG. 6, the no-back 16 is shown in a no-back condition (also depicted in FIG. 3d). The no-back condition, which is generally described above, may be caused by the failure of the drive line torque shaft 12 or the PDU 14, for example. In either case, the no-back input shaft 30 would not impart a forward input $I_{forward}$ sufficient to oppose the load L. In fact, when in the no-back condition there may be no input present at all (as the drive line torque shaft may have completely failed, for example). Regardless, when the forward input $I_{forward}$ is insufficient to oppose the load L, the no-back output shaft 36 is urged in a reverse rotational direction. Since the no-back output shaft 36 is only coupled to the output disc 38, rather than both of the input and output discs 32, 38, the input and output discs 32, 38 are brought out of alignment. That is, the ballramps 35, 37 of the input and output discs 32, 38 are brought out of alignment with one another. As explained above, this misalignment causes the balls 44 to be positioned away from the center of the ballramps 35, 37 and toward the shallow end portions 60, 64, for example (see FIG. 3c). Because of this positioning of the balls 44 within the ballramps 35, 37, the input and output discs 32, 38 are spaced relative to one another (generally indicated as the distance $X_2$ in FIGS. 3d and 3f). In FIG. 6, this relative movement of the input and output discs 32, 38 is represented by downward movement of the output disc 38. Movement of the output disc 38 also causes the cone brake 40 to move toward the spring 46 and the housing 50 (the spring 46 may contact the housing 50 by way of the spacer 80 and retaining ring 81). The axial load that is generated by the positioning of the balls 44 within the ballramps 35 and 37 is sufficient to generate friction between the cone brake 40 and the output disc 38 and between the cone brake 34 and the input disc 32. This friction between the input and output discs 32, 38 and the cone brakes 34, 40 generates a combined resistance torque ($T_r$) sufficient to overcome the torque imparted onto the no-back output shaft 36 by the load L, defined above as $T_{load}$. Thereby, no-back 16 prevents the load 17 from being displaced, and the no-back condition is effectively provided.

Figure 7:
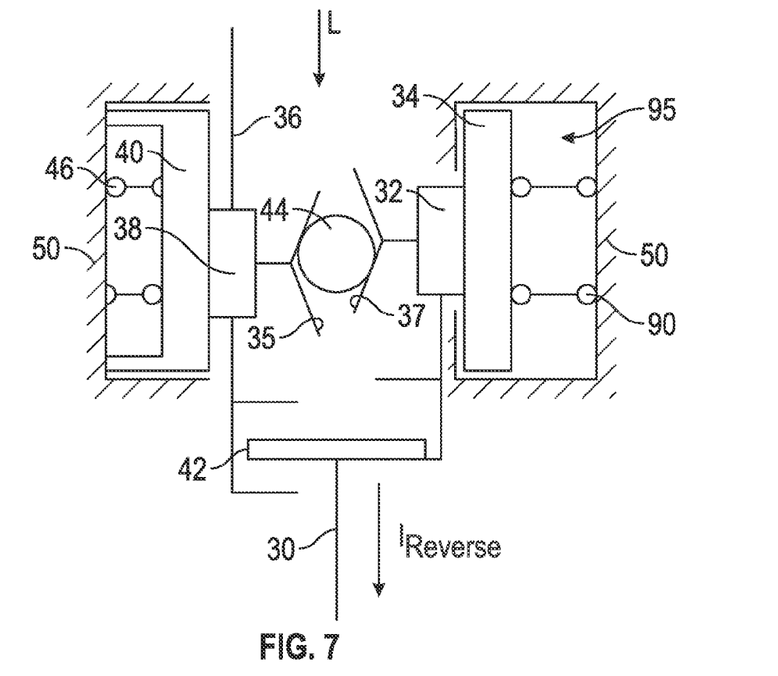
FIG. 7 is a schematic representative of the no-back in an aiding load condition.

Referring to FIG. 7, the no-back 16 is shown in an aiding-load condition, wherein the no-back 16 may be released from the no-back condition. Essentially, the no-back 16 can be released by adjusting the resistance torque ($T_r$). This may be accomplished by applying, a reverse input, $I_{reverse}$, to the no-back input shaft 30 of a sufficient magnitude to reduce the gain (G) to less than 1. In this way, the resistance torque ($T_r$) is reduced and rotation of the input and output discs 32, 38 and input and output shafts 30, 36 is again possible.

A worker of ordinary skill in this art would recognize that certain modifications of the instant disclosure would come within the scope of the claims. For example, although the no-back 16 has been described with reference to cone brakes 34, 40, alternate brake designs are contemplated within the scope of this disclosure. That is, the cone brakes 34, 40 may be representative of any brake arranged radially outward of the input and output discs 32, 38. Further, while the no-back 16 has been described with reference to use in aircrafts, one of ordinary skill would recognize that the no-back 16 need not be limited to use in aircrafts, and indeed may be applicable for use in other settings. Accordingly, the following claims should be studied to determine their true scope and content.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A no-back assembly comprising:
   a first disc coupled to a first shaft and arranged radially outward of the first shaft;
   a first brake arranged radially outward of the first disc, the first brake being configured to prevent the first disc from rotating when in a no-back condition;
   a spring adjacent the first brake, the spring configured to urge the first brake toward the first disc to prevent the first disc from rotating when in the no-back condition;
   a second disc coupled to a second shaft and arranged radially outward of the second shaft;
   a second brake arranged radially outward of the second disc, the second brake being configured to prevent the second disc from rotating when in the no-back condition;
   at least one pin operatively coupling the first brake and the second brake to a housing of the no-back assembly;
   a gain reduction spring disposed within a recess of the housing; and
   a piston disposed in continuous, direct contact with the gain reduction spring and a first side of the pin, wherein the gain reduction spring continuously biases the piston against the first side of pin, wherein a second side of the pin is in continuous, direct contact with, and biased against, a retaining ring that is in continuous, direct contact with the housing.

2. The no-back assembly of claim 1, wherein the first disc is an output disc, the first shaft is an output shaft, the second disc is an input disc, and the second shaft is an input shaft; and
   wherein the first disc is arranged radially outward of the first and second shafts.

3. The no-back assembly of claim 1, wherein, when in the no-back condition, the first and second brakes contact a respective one of the first and second discs such that the first and second shafts are substantially prevented from rotating.

4. The no-back assembly of claim 3, wherein the first shaft is urged in forward rotational direction by a forward input and is urged in a reverse rotational direction by a load, the reverse rotational direction opposite the forward rotational direction, the first shaft being operatively coupled to the second shaft.

5. The no-back assembly of claim 4, wherein, when in the no-back condition, there is no input.

6. The no-back assembly of claim 5, wherein each of the first and second brakes are rotatably fixed relative to the first and second discs and include a sloped surface on an inner periphery thereof, the sloped surfaces of the first and second brakes being inclined relative to an axis of the first and second shafts, each of the first and second discs including a sloped surface about the outer periphery thereof, the sloped surfaces of the first and second discs inclined to be substantially parallel to the sloped surfaces of respective first and second brakes.

7. The no-back assembly of claim 6, wherein, when in the no-back condition, the sloped surfaces of the first and second brakes contact respective sloped surfaces of the first and second discs such that a resistance torque is generated that is larger than a torque created by the load urging the first shaft in the reverse rotational direction.

8. The no-back assembly of claim 7, wherein each of the first and second discs include a ballramp formed therein, respective ballramps of the first and second discs being generally aligned with and facing one another.

9. The no-back assembly of claim 8, further comprising a ball positioned between the first and second discs such that the ball is supported partially by the ballramp of the first disc and partially by the ballramp of the second disc.

10. The no-back assembly of claim 9, wherein each of the ballramps are formed with a varying depth, the ballramps being deepest at a center portion, ends of the ballramps including sloped portions such that the ballramps taper downwardly from the ends to the center portion.

11. The no-back assembly of claim 10, wherein the first brake is axially slidable and rotatably fixed relative to a housing, the first brake is in contact with the spring on a first side of the first brake and is in contact with the first disc on a second side of the first brake, the second side of the first brake being generally opposite the first side of the first brake.

12. The no-back assembly of claim 1, wherein at least one of the first brake and the first disc includes a sloped surface on a periphery thereof, the sloped surface being inclined relative to an axis of the first shaft.

13. The no-back assembly of claim 1, wherein the first brake is disposed about the outer periphery of the first disc.

14. The no-back assembly of claim 1, wherein, when in the no-back condition, the first disc is urged in a first axial direction and the first brake is urged by the spring in a second axial direction opposite the first axial direction such that the brake is wedged into the disc, thereby preventing the disc from rotating.

* * * * *